United States Patent [19]
Foster et al.

[11] Patent Number: 5,503,091
[45] Date of Patent: Apr. 2, 1996

[54] APPARATUS FOR CONDITIONING GOLF GREEN

[76] Inventors: James S. Foster, 714 Dayton Ave., Vancouver, Wash. 98664; Brian K. Muchmore, 1336 SW. Hall Blvd., Tigard, Oreg. 97223

[21] Appl. No.: 186,757

[22] Filed: Jan. 25, 1994

[51] Int. Cl.$^6$ .................................................. A01C 23/02
[52] U.S. Cl. ........................... 111/127; 111/118; 239/551; 239/563; 239/754
[58] Field of Search ...................... 111/127, 118, 111/119; 239/551, 563, 754; 222/52, 613, 614, 615, 618

[56] References Cited

U.S. PATENT DOCUMENTS

| 2,780,888 | 2/1957 | Novak et al. | 47/58 |
|---|---|---|---|
| 2,930,334 | 3/1960 | Marron et al. | |
| 3,012,526 | 12/1961 | Baldwin et al. | |
| 3,418,813 | 12/1968 | Dillon | |
| 3,873,487 | 3/1975 | Minato et al. | |
| 3,900,378 | 8/1975 | Yen et al. | |
| 3,926,131 | 12/1975 | Collins | 111/118 |
| 4,009,666 | 3/1977 | Russell et al. | |
| 4,074,858 | 2/1978 | Burns et al. | 111/127 X |
| 4,185,774 | 1/1980 | Tidwell | 239/551 X |
| 4,265,403 | 5/1981 | Bonetti | 239/551 X |
| 4,301,620 | 11/1981 | Koslow et al. | 47/58 |
| 4,380,886 | 4/1983 | Koslow et al. | 47/58 |
| 4,540,427 | 9/1935 | Helbling | 71/27 |
| 4,560,588 | 12/1985 | Nethe et al. | 427/215 |
| 4,624,193 | 11/1986 | Johnston | 111/127 |
| 4,637,759 | 1/1987 | Owa et al. | 405/270 |
| 4,807,544 | 2/1989 | Cross et al. | 111/127 |
| 4,907,516 | 3/1990 | Rogers | 111/127 |
| 4,970,973 | 11/1990 | Lyle et al. | 111/127 |
| 5,050,771 | 9/1991 | Hanson et al. | 222/52 X |
| 5,119,744 | 6/1992 | Comer | 111/127 |
| 5,120,344 | 6/1992 | Liber et al. | 71/27 |
| 5,303,663 | 4/1994 | Salestrom | 111/118 X |

FOREIGN PATENT DOCUMENTS 339008 10/1989 European Pat. Off. ............... 239/551

Primary Examiner—Randolph A. Reese
Assistant Examiner—Christopher J. Novosad
Attorney, Agent, or Firm—Marger, Johnson, McCollom & Stolowitz

[57] ABSTRACT

A light-weight turf conditioning machine provides programmable subterranean soil processing. The machine includes a set of electronically controlled air guns that are mounted on a frame a given distance above the ground. Each air gun disperses a high pressure stream of fluid into the ground in a vertically aligned cylindrical shape drilling holes into a golf green. The holes are drilled using a hydrated polymer that absorbs and releases moisture in a controlled fashion fostering plant growth. A programmable controls circuit controls the rate, pattern and depth in which holes are drilled into a golf green. A portable storage tank is fluidly joined by a hose to the air guns. The hose allows the storage tank to spaced from the machine as the air guns are carried over the golf green.

16 Claims, 11 Drawing Sheets

APPARATUS FOR CONDITIONING GOLF GREEN

BACKGROUND OF THE INVENTION

This invention relates generally to turf conditioning apparatus and more particularly to a light-weight, computer controlled liquid injection system for conditioning golf greens.

Golf greens on golf courses must be meticulously cared for to remain in proper condition for playing golf. For example, if the golf green is too dry or becomes too compacted, the ground becomes too hard and the golf ball will not properly bounce or "bite" on the golf green. If there is heavy traffic on the golf green, part of the green becomes compact, creating an uneven putting surface. Extensive use of a golf green also results in severe turf wear. Extensive soil compaction reduces water infiltration into the soil, percolation and drainage out of the soil and tends to restrict and reduce root growth.

Many turf aeration systems have been developed that cultivate the ground to increase water drainage and spur proper root growth. One method presently used for conditioning soil consists of directing fluid at high pressure into the ground to breakup or cultivate the soil.

For example, U.S. Pat. No. 5,119,744 to Comer shows a hydraulic aeration system that lifts and fractures the subsurface soil to decrease soil density. The system in Comer provides individual high-pressure jets of fluid that are output from corresponding nozzles. Each nozzle generates a conical fluid dispersion pattern that is directed laterally from the direction of fluid penetration into the ground. The distance between each nozzle and the speed in which the machine is propelled over the ground cause the dispersion patterns of adjacent nozzle jets to coact lifting and fracturing the soil to reduce soil density.

The system shown in Comer, however, is a general purpose turf conditioning system and is not capable of meeting the meticulous conditioning requirements of golf greens. For example, the wide laterally extending fluid dispersion pattern in Comer forms large conically shaped holes underneath the ground. The large amount of soil displacement created by each nozzle is problematic since spray from adjacent nozzles overlap. Thus, the entire soil substructure is disrupted. Large overlapping holes are created underneath the turf surface which are susceptible to "cave-ins". Thus, if too much pressure is exerted on the top of the golf green after the Comer aeration process has been performed, the top surface of the green can actually cave-in forming divots.

In addition, Comer disperses the same depth and the same pattern of fluid into the ground regardless of turf conditions. A more compact soil; a harder soil, such as clay; or a drier soil requires more fluid pressure or a longer fluid dispersion time to drill a given distance into the ground than softer soil conditions. However, if the fluid pressure is too high or if the nozzles are kept on too long, the aeration system will displace too much soil severely damaging the golf green.

The system disclosed in Comer is also heavy and actually compacts the soil as it travels over the golf green. For example, the system in Comer contains a water accumulator, a large engine and a pump. The weight of all this equipment negates some beneficial effects of aeration by further compressing the soil. For sensitive turf surfaces, such as golf greens, even lightweight machinery is prohibited. The system in Comer creates depressions or ruts in the turf surface, actually degrading rather than opposed to improving golf green conditions.

U.S. Pat. No. 4,009,666 to Russell et al. discloses an apparatus for injecting liquid below the surface of turf. Russell et al., applies a continuous stream of liquid into the turf rather than periodic slugs, or jets, of pressurized liquid. A continuous stream creates continuous cuts in the top surface of the ground which often are not desirable for golf green preparation. In addition, the system in Russell et al. maintains the same fluid pressure independently of soil conditions. Thus, the depth of each cut may be either too deep or too shallow.

U.S. Pat. No. 4,907,516 to Rogers shows a tractor that injects fertilizer and other liquid crop treatments into the ground by directing injection jets with a nozzle. A solenoid controlled valve generates short pulses of fluid that penetrate 2 to 4 inches into the ground. The system in Rogers, however, is used for inserting fertilizer and is not designed for the precise conditioning requirements of a golf green. For example, the tractor in Rogers is too heavy and would severely compress the soil when traveling over a golf green. Thus, the system would worsen turf conditions by placing ruts in the golf green. In addition, Rogers as in Russell et al. and Comer, does not vary the amount of fluid dispersion according to present turf conditions.

Accordingly, a need remains for a light-weight golf green conditioning system that is adaptable to different turf conditions.

SUMMARY OF THE INVENTION

It is, therefore, an object of the invention to increase control of a golf green conditioning machine for adaptation to various golf green conditions. Another object of the invention is to increase the effectiveness of turf conditioning machines in fostering higher quality turf growth.

A further object of the invention is to reduce the size and weight of golf green conditioning machines while increasing machine functionality.

A light-weight turf conditioning machine provides programmable subterranean soil processing. The machine is highly adaptive to varying soil, compaction and moisture conditions. The machine is also small and lightweight for increased maneuverability and to minimize soil compaction.

The machine includes a frame having front and back rollers that extend from a bottom side. A set of electronically controlled air guns are mounted on the frame a given distance above the golf green and disperse a high pressure stream of fluid into the ground. Each air gun includes a nozzle containing a baffle that directs fluid into the ground in a narrow substantially vertically aligned stream. The narrow jet pattern of the fluid drills vertically elongated holes into the ground that maintain a substantially uniform cross-sectional shape.

According to another aspect of the invention, the holes are drilled into a golf green using a hydrated polymer. The narrow diameter of each hole is more effective in retaining the polymer material in turn providing more effective water absorption. The narrow diameter of each hole also allow each hole to be drilled deeper into the ground without overlapping with adjacent holes. Thus, the subterranean structure of the golf green is maintained and there is less chance of a surface cave-in.

A programmable control circuit individually controls the dispersion of fluid from each nozzle and at the same time controls the rate at which each nozzle is actuated. The control circuit can also selectively change the fluid pressure of each jet, the relay controlling how far each hole is drilled into the ground. A microprocessor is coupled to a set of solenoids that pneumatically control the actuation and deactivation of the air guns. A bank of switches coupled to the microprocessor control which solenoids are actuated, in what type of pattern, and at what rate. Thus, the machine improves control and precision of the holes drilled in the golf green.

In another feature of the inventive system, a portable storage tank is fluidly joined by a hose to the air guns. The hose allow the storage tank to be located off the golf green while the air guns are dispersing fluid into the golf green. Separating the tank from the rest of the machine reduces weight preventing excessive soil compaction during turf preparation. An elongated high pressure manifold is spaced horizontally in front of the air guns in a parallel relationship. The manifold is coupled to the air gun just above the nozzle to maintain high fluid pressure.

The machine frame comprises vertically aligned side walls each joined together at a back end by a back wall. The side walls and the back wall are each joined at a top end by a horizontally aligned mounting plate. The frame wheels comprise a pair of elongated rollers positioned in front and in back of the air guns, respectively, evenly distributing frame weight. The back roller is propelled by a engine attached to the top of the mounting plate.

The side walls and the back wall form a substantially rectangular external box. The mounting plate extends from the top of the back wall partially over the top ends of the side walls. The guns are mounted at a front end of the frame between the two side walls and in front of the mounting plate. The open front end of the frame allows easy access and maintenance of the air guns. The frame and everything attached on top of the frame weigh around 200 pounds.

The control circuit can intermittently actuate different combinations of air guns each discharge cycle. Thus, the control circuit can vary both the distance between consecutive holes formed by the same gun and at the same time control the spacing between holes made by adjacent air guns. Thus, different hole patterns can be formed in the golf green that are more effective in treating the present turf conditions. In addition, the different hole patterns create a more aesthetically pleasing turf surface.

Holes are drilled into the ground at different depths according to the type of soil and the soil's present moisture content. Thus, soil preparation is customized to specific turf conditions. Fluid dispersion is controlled without having to physically move the nozzles closer to the ground, manually disabling and enabling guns and without having to manually vary the fluid pressure pumped into each air gun. Thus, changing system operating conditions is quicker and more precise. The air guns can also be constantly held on as the frame is moved along the golf green for continuous turf cuts.

The foregoing and other objects, features and advantages of the invention will become more readily apparent from the following detailed description of a preferred embodiment of the invention which proceeds with reference to the accompanying drawings.

DETAILED DESCRIPTION OF THE PREFERRED EMBODIMENT

Figure 1:
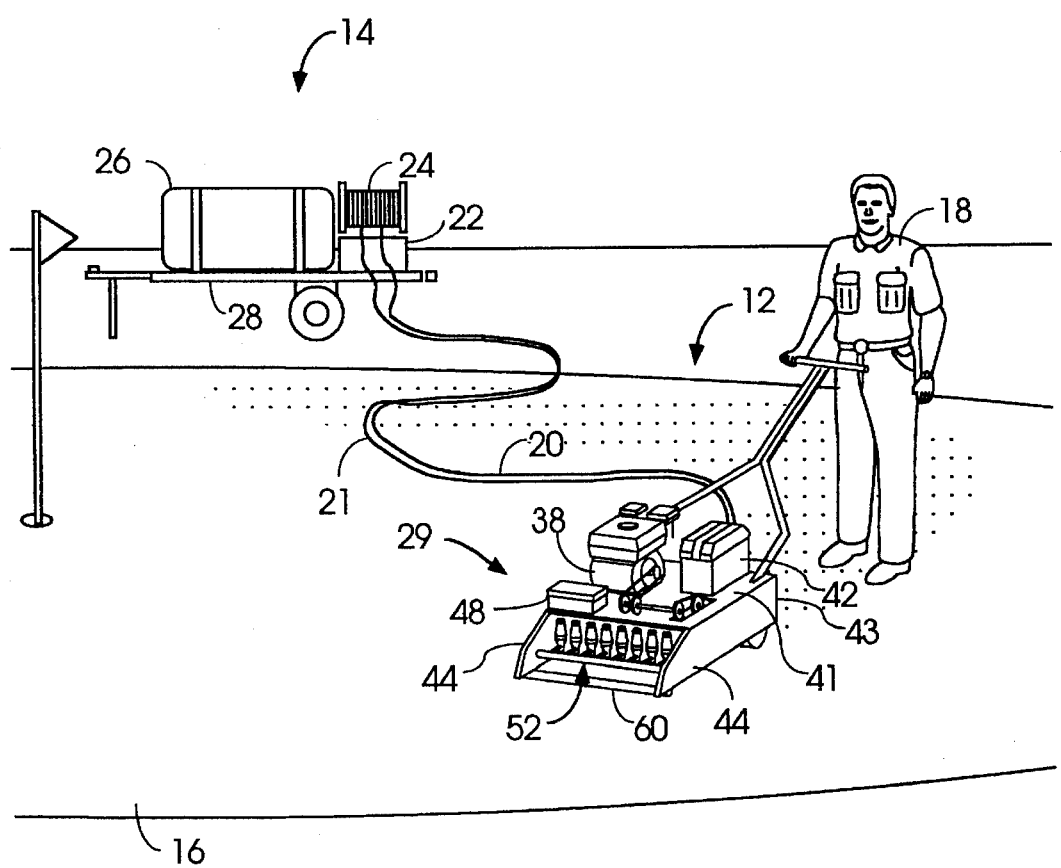
FIG. 1 is a perspective view of a turf conditioning machine according to the invention shown in use on a golf green.

FIG. 1 is a perspective view of a turf conditioning machine 12 according to the invention located on a golf green 16. Machine 12 is attached by an air hose 21 and a fluid hose 20 to a support system 14. The support system 14 includes a trailer 28 that supports a 200 gallon tank 26, a hose reel 24, and compressor 22. Fluid stored in tank 26 is pumped at high pressure over fluid hose 20 to machine 12. Compressor 22 transfers compressed air over air hose 21 to machine 12. Reel 24 dispenses the air hose 21 and the fluid hose 20 and allows trailer 28 to be located off of golf green 16 as machine 12 is being operated. Thus, machine 12 is hand-driven by an operator 18 over golf green 16 without the additional weight of tank 26 and compressor 22.

Figure 2:
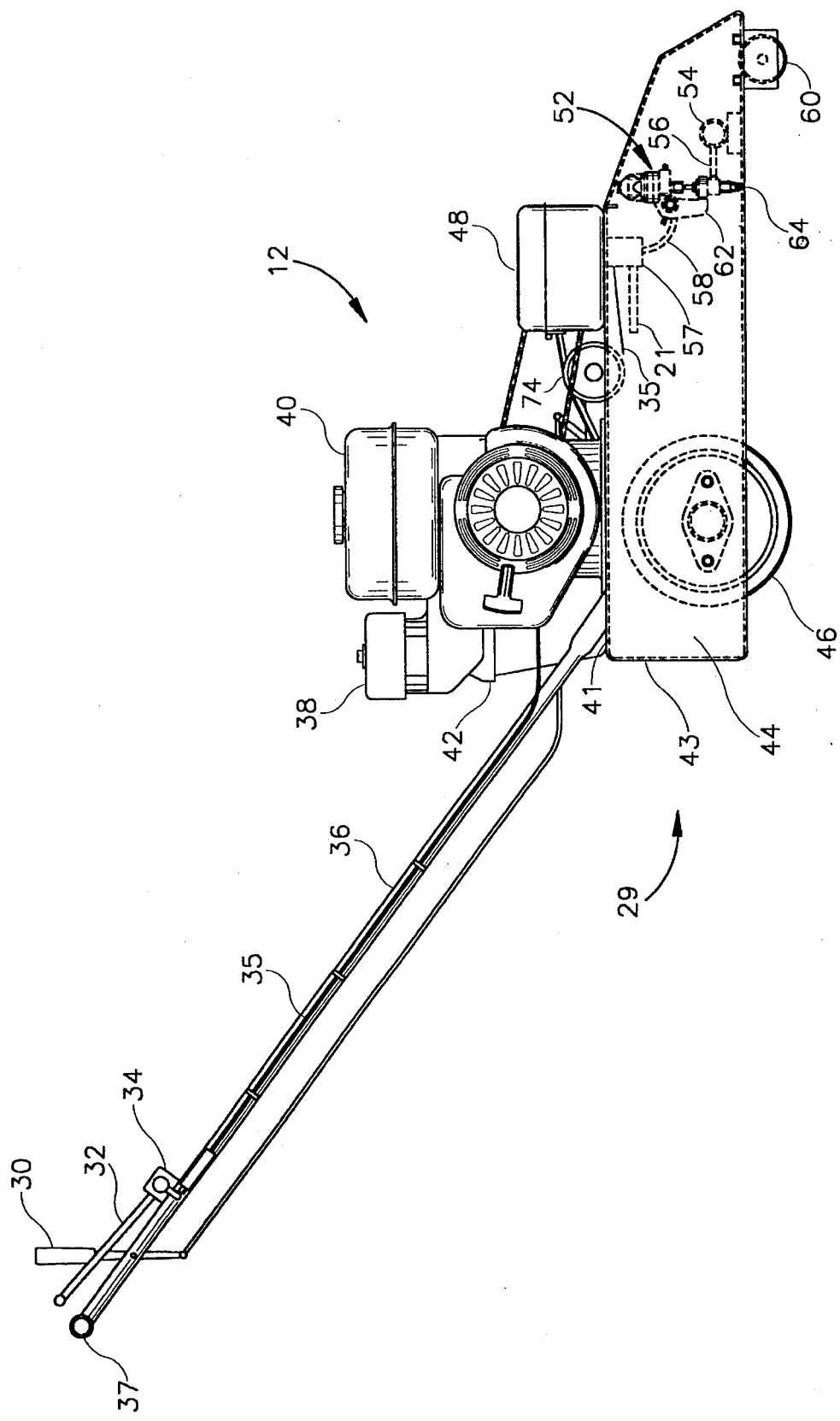
FIG. 2 is a left side elevation of the turf conditioning machine shown in FIG. 1.

FIG. 2 is a left side elevation of the machine 12 shown in FIG. 1. Referring to FIGS. 1 and 2, a frame 29 includes two vertically aligned side walls 44 joined together at a back end by a vertically aligned back wall 43. The top end of both side walls 44 and the back wall 43 support a top mounting plate 41. The mounting plate 41 extends from a back end of frame 29 partially along the top of sides 44. The side walls, back wall, and mounting plate are all formed of metal.

A handle 36 is attached to the back end of frame 29 and includes a hand grip 37 at a top end. A lever 32 actuates a safety switch 34 coupled by a cable 35 to a solenoid controller 57 located underneath mounting plate 41. A lever 30 is attached to the top end of handle 36 and is mechanically coupled to a clutch 74. Mounting plate 41 supports an engine 38 having a gas tank 40, a battery 42, and a control box 48. A row of air guns 52 are pneumatically controlled by solenoid controller 57 via individual air hoses 58. A manifold 54 provides fluid from fluid hose 20 (FIG. 1) to air guns 52. Each air-gun contains a nozzle 64 that disperses the fluid vertically downward into the ground. A rod 63 is coupled between the side walls 44 of frame 29 and extends through a mounting bracket 62 on the back of each air gun 52 for mounting the air guns to frame 29 a given distance above the ground. A front roller 60 is located in the front of frame 29 and a rear roller 46 is located at the back end of frame 29 for rolling the machine over the green.

Figure 3:
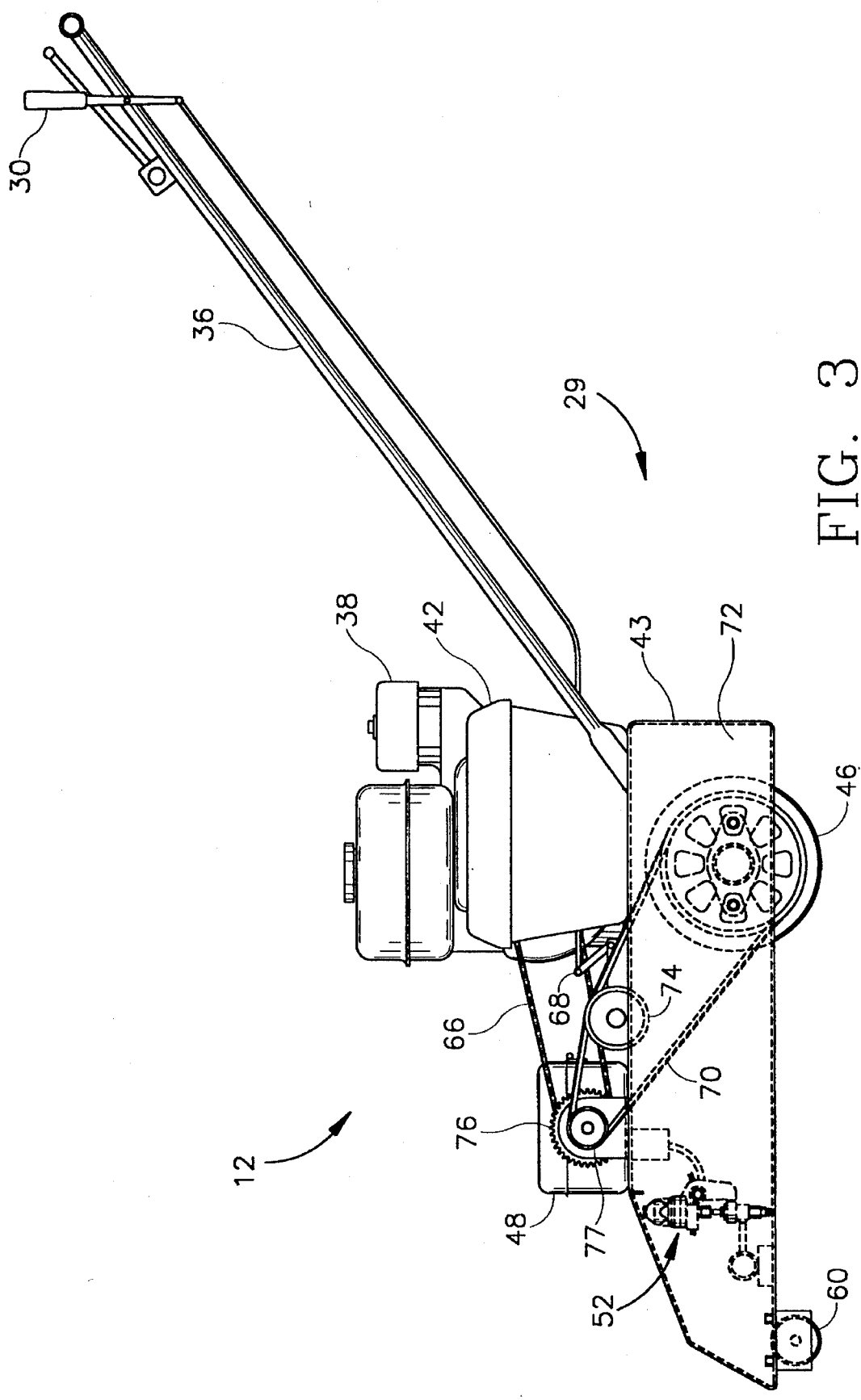
FIG. 3 is a right side elevation of the turf conditioning machine shown in FIG. 1.

FIG. 3 is a right side elevation of machine 12 showing in more detail the clutch mechanism for initiating forward movement of machine 12. Lever 30 actuates the clutch 74 via linkage 68 engaging a belt 70. engine 38 drives a chain 66 in turn rotating a sprocket 76 and a pulley 77. When clutch 74 is engaged with belt 70, engine 38 drives pulley 77. Pulley 77 rotates belt 70 in turn rotating a pulley located on the end of roller 46. Thus, machine 12 is self-propelled in a forward direction.

Figure 4:
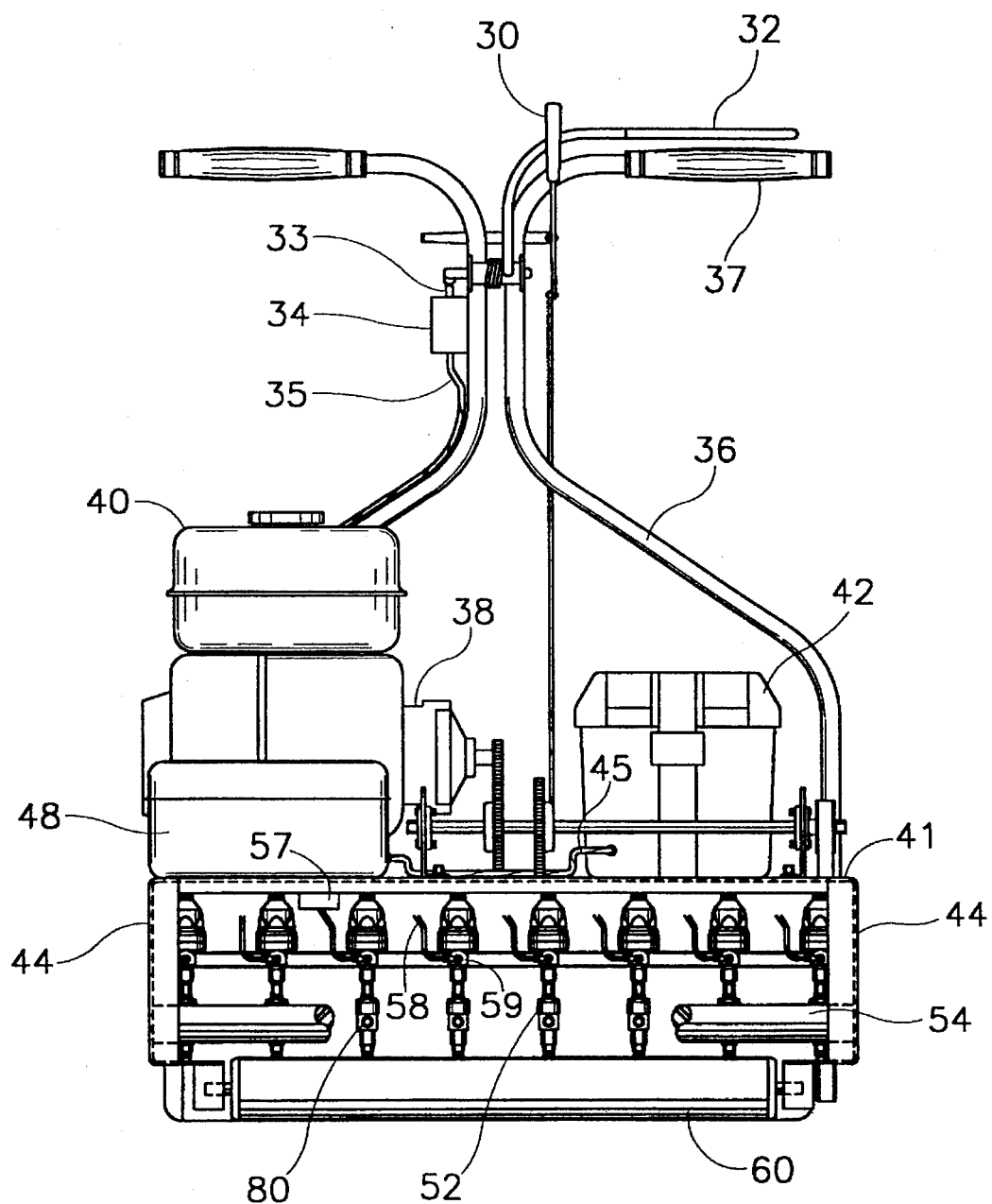
FIG. 4 is a front elevation of the turf conditioning machine shown in FIG. 1.

FIG. 4 is a front elevation of machine 12. The solenoid controller 57 is enabled when lever 32 is pressed downward against hand grip 37. In the depressed state, lever 32 depresses a button 33 on safety switch 34 completing a connection in cable 35. The signal on cable 35 enables solenoid controller 57. Control box 48 is water resistent and contains a programmable control circuit 78 shown in detail in FIG. 8. The control circuit 78 receives power from battery 42 over cable 45 and sends control signals to solenoid controller 57 (see FIG. 8).

Each air gun 52 includes an air nozzle 59 pneumatically coupled by an air hose 58 to a first side of solenoid controller 57. Air hose 21 is coupled to the second side of solenoid controller 57. Manifold 54 is joined at opposite ends to side walls 44 and is coupled to fluid hose 20 (FIG. 1). Manifold 54 contains individual couplers 56 that connect into a lower nozzle 80 on each air gun 52 (FIG. 4). Front roller 60 extends across the front of air guns 52 and is joined on opposite ends to side walls 44.

Figure 5:
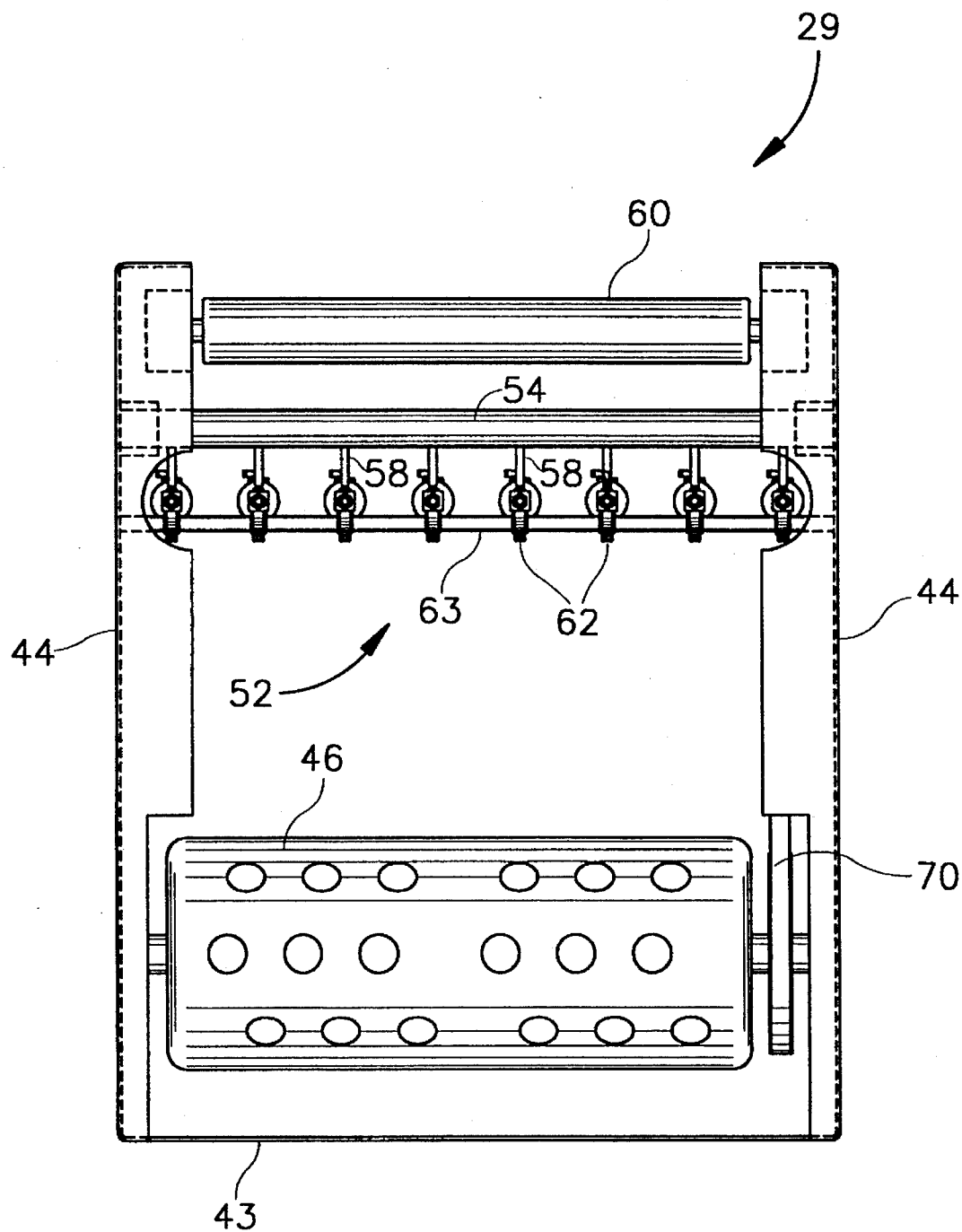
FIG. 5 is a bottom view of the turf conditioning machine shown in FIG. 1.

FIG. 5 is a bottom view of machine 12 shown in FIG. 1. The rear roller 46 is joined at opposite ends to side walls 44 and is driven by belt 70 as described above in FIG. 3. Rod 63 passes through each air gun mounting bracket 62 and is joined at opposite ends to side walls 44. Front roller 60 and back roller 46 operate in conjunction to transport frame 29 over golf green 16 (FIG. 1). The wide rollers evenly distribute the weight of machine 29 to eliminated ruts in the top surface of the golf green.

Figure 6:
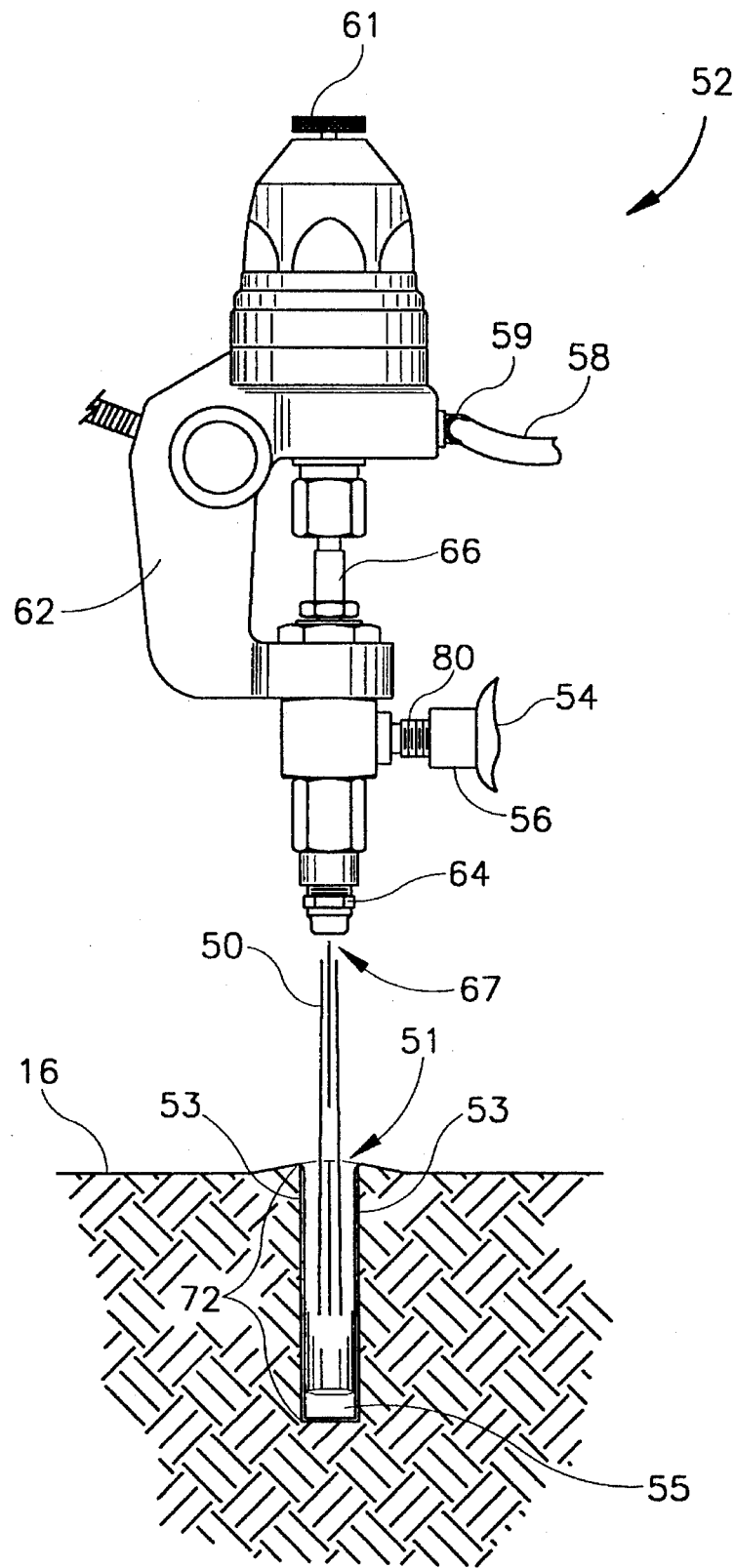
FIG. 6 is a detailed side view of an air gun attached to the turf conditioning machine shown dispersing fluid into the ground.

FIG. 6 is an enlarged detailed side view of an air gun 52 from machine 12 dispersing a fluid 50 into the ground. Air gun 52 is a standard air gun and is, therefore, not described in detail. A top shut-off valve 61 can be manually switched to disable air-gun 52. Air pressure from hose 58 (FIG. 4) lifts a valve 66 allowing fluid from manifold 54 (FIG. 4) to enter into nozzle 80 and out nozzle 64. Nozzle 64 disperses the fluid 50 into the golf green 16 drilling a hole 51. Because manifold 54 is located so close to the nozzle section or "head" of gun 52, high fluid pressure is maintained right up to the nozzle 64. Other spray guns connect fluid at an upper location on the spray gun that can reduce fluid pressure and retard fluid speed. The distance between nozzle 80 and nozzle 64 is approximately 1½ inches.

Figure 7:
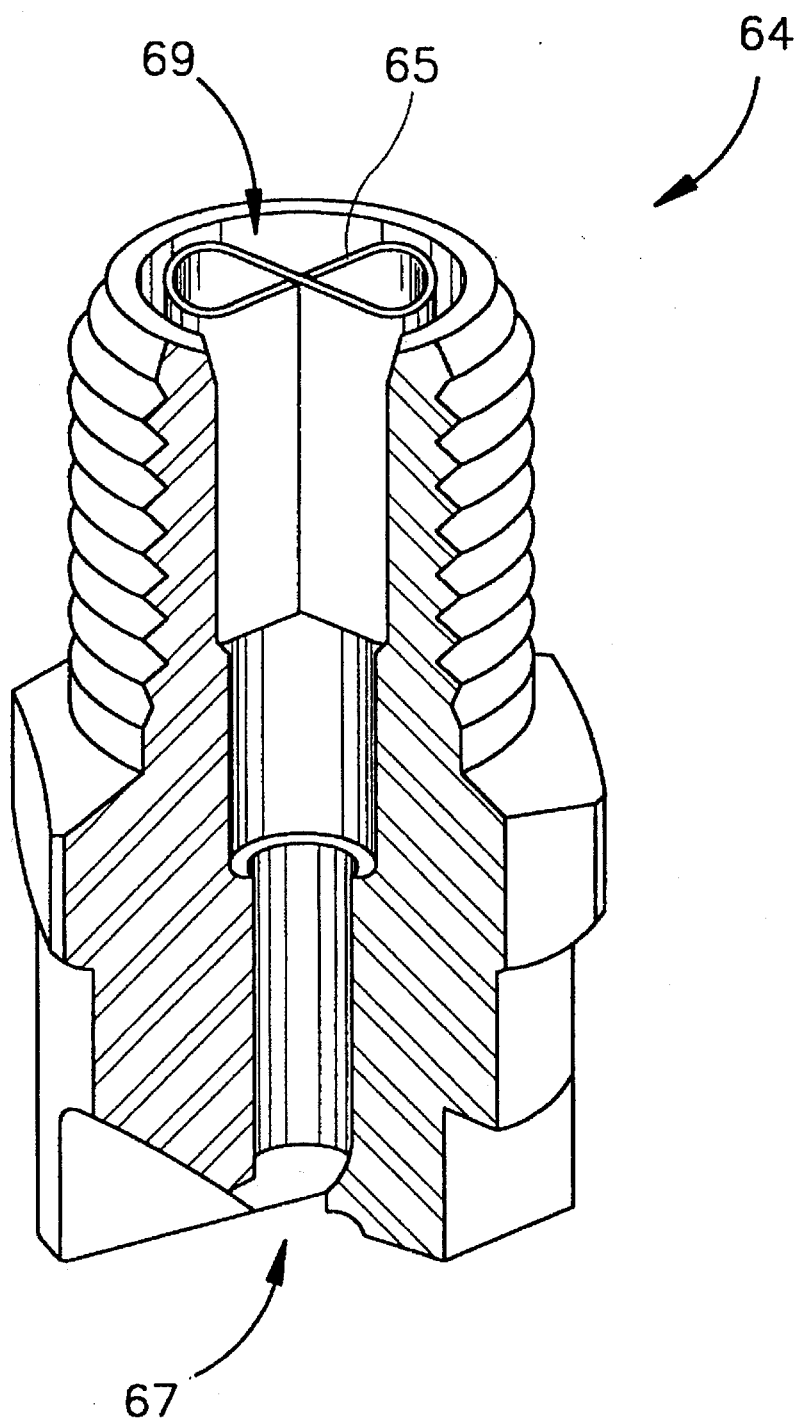
FIG. 7 is a detailed cutaway view of a nozzle for the air gun shown in FIG. 6.

Referring to FIGS. 6 and 7, nozzle 64 contains a rigid baffle 65 that creates a vertically directed spray swath from an orifice 67 as shown in FIG. 6. Baffle 65 has a "figure 8" cross-sectional shape that prevents the fluid 50 entering nozzle 80 from swirling inside cavity 69. The stagnant fluid created by baffle 65 allows fluid 50 to disperse uniformly downwardly in a substantially cylindrical spray pattern.

The cylindrical spray pattern drills hole 51 to a desired depth 72 into the ground. Hole 51 has a consistent circular cross-sectional shape with vertically descending parallel walls 53. The narrow cross-sectional diameter of hole 51 can be drilled deep into the ground without overlapping with the holes drilled from adjacent air guns. Thus, the existing subterranean structure of the golf green remains strong enough to prevent cave-in's. Because only a small amount of soil is displaced by fluid 50, the substructure of the golf green is strong enough for immediate utilization by golfers. Other aeration systems create laterally overlapping holes underneath the turf that prevent golf green utilization for extended periods of time.

In one preferred embodiment, the hole depth is drilled between 2–4 inches and has a diameter of approximately 0.25 inches. The pressure coming out of nozzle 64 is between 2000–5000 psi. The nozzle height is preferably located about ⅜ inch above the ground. In one preferred embodiment, the air guns receive fluid at 3500 pounds per square inch from manifold 54 at the end of each tip 64 and disperses fluid at approximately 6650 pounds per square inch which hits the ground at approximately 722 feet per second. Various fluids can be dispersed through air guns 52. For example, water can be used to drill hole 51.

Another material used for drilling hole 52 is a hydrated polymer that serves to absorb surface water on the golf green 16. Hydrated polymers or "water polymers" are the same as or similar to substances used in diapers to absorb water, leaving the diaper seemingly dry. Hydrated polymers injected into turf serve to hold water from the soil surface, reducing the accumulation of water on the surface and making the water available for absorption by grass roots.

The long, narrow shape of hole 51 allow the polymer material to absorb water more effectively. In wider holes, the hydrated polymer material has a tendency to dissipate into the soil. The narrower hole diameter allows more of the polymer to coagulate or "puddle" in the bottom of the hole, such as puddle 55, providing more effective moisture retention. Thus, more water can be absorbed and a high moisture content can be maintained on golf green 16 for longer periods of time, without flooding the surface. Further, because each hole 51 maintains vertical side walls 53, there is less chance of hole overlap from adjacent air guns. Thus, each hole can be drilled deeper to retain more polymer without jeopardizing the subterranean strength of the golf green.

Figure 8:
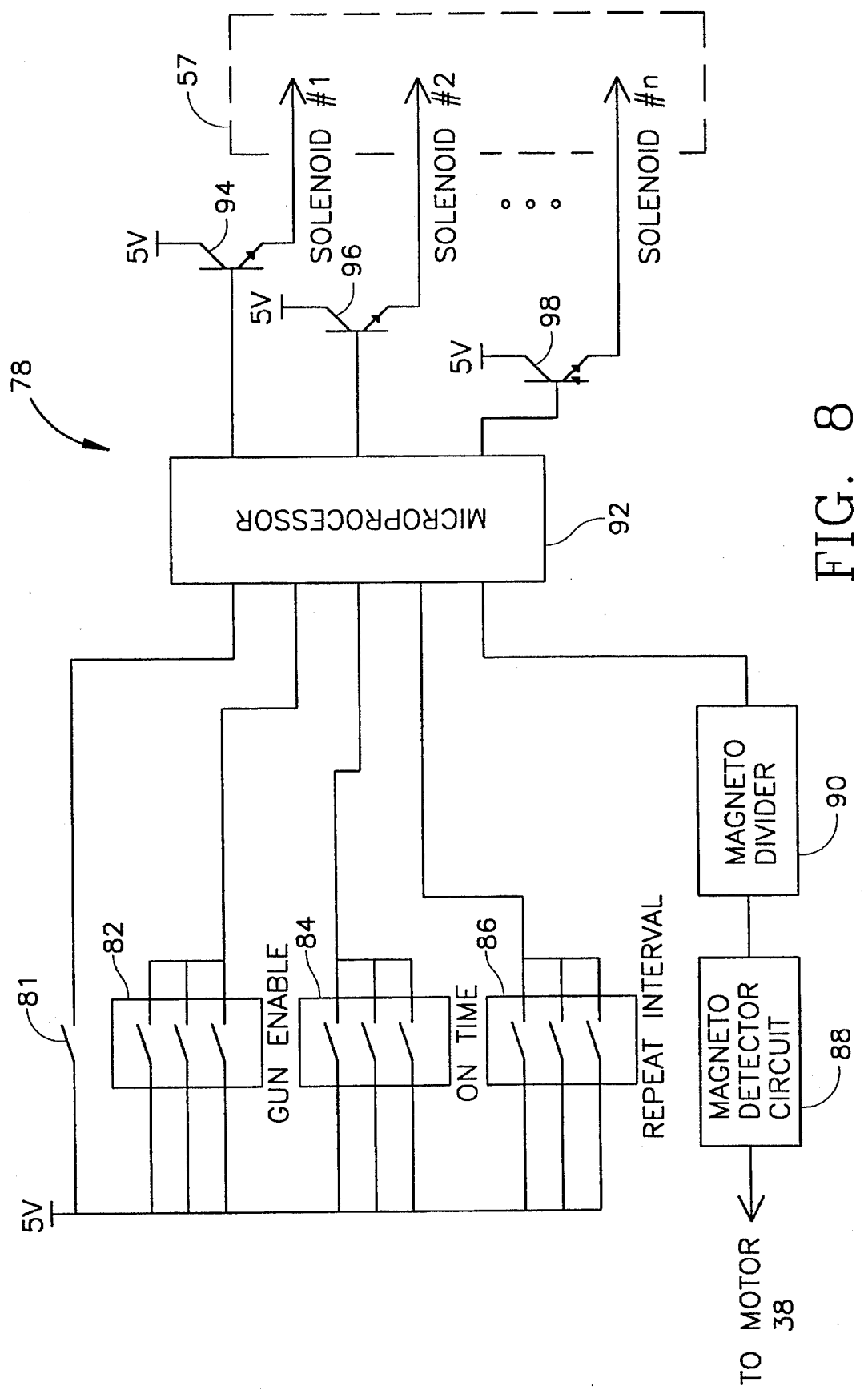
FIG. 8 is a circuit diagram of a programmable control circuit that controls activation of the turf conditioning machine air guns.

FIG. 8 is a circuit diagram of the programmable control circuit 78 contained in control box 48 (FIG. 4). An on-off switch 81 activates a microprocessor 92. A set of dual in-line package (DIP) switches 82, 84 and 86 are coupled between a 5 volt DC power supply and microprocessor 92. The 5 volt power supply is generated from battery 42 (FIG. 4). A magneto detector circuit 88 is coupled between engine 38 (FIG. 2) and a magneto divider circuit 90. The output of magneto divider 90 is coupled to microprocessor 92. An array of transistors 94, 96, and 98 couple outputs from microprocessor 92 to various solenoid relays in solenoid controller 57. Solenoid controller 57 includes an array of standard electric air valves such as model no. M1251LW made by Humphrey and is, therefore, not described in detail.

DIP switch 84 controls the amount of time each air gun 52 remains activated during any one discharge cycle. For example, a first switch in DIP switch 84 when closed keeps each air gun activated, for example, for 0.05 seconds. Closing a second switch in DIP switch 84 increases the on time for each activated air gun to, for example, 0.1 seconds. Controlling the on time of each air gun is important to prevent slitting when the air guns are moved forward over the golf green. For example, if the guns remain on too long, the high pressure fluid can cut elongated slits in the forward frame direction. Thus, air gun activation time is automatically adjusted according to frame speed.

In addition, each nozzle may be activated for a longer period according to the type of soil. For example, a hard clay material may require a longer air gun activation time to drill a hole 51 a desired depth 72 (FIG. 6). Thus, DIP switch 84 allows the hole depth to be changed without having to manually change the distant each nozzle 64 is held above the ground or the speed of machine 29. The on-time is typically controllable to increments of 0.05 seconds. Thus, holes can be drilled with more precision. DIP switch 86 controls the frequency between each air gun discharge cycle. For example, closing a first switch in DIP switch 86 directs each activated air gun to drill a hole every three inches. By closing a second switch in DIP switch 86 a hole is drilled every two inches, etc. DIP switch 86 operates either independently or in coordination with magneto detector circuit 88.

To monitor the speed of machine 12 as it travels over the golf green, magneto detector circuit 88 monitors magneto firings from engine 38. For example, as the rotations per minute (RPM) of engine 38 increase, the fire rate of the engines magneto increases. Thus, the speed that the machine 12 moves across the golf green is proportional to magneto fire rate. Magneto divider circuit 90 divides the number of detected firings from magneto detection circuit 88 into a sequence of pulses that are sent to microprocessor 92. According to the pulse rate from magneto divider 90 and the switch setting in DIP switch 86, microprocessor 92 determines the speed in which the frame 29 is traveling over the golf green. According the microprocessor 92 calculates how often each enabled air gun must be activated to drill holes at a predetermined distance. The magneto detector circuit 88, magneto divider 90 and the software to calculate the repeat interval for each air gun are easily implemented by one with average skill in the art and are, therefore, not described in detail. Air guns 52 typically operate up to 180 cycles per minute.

DIP switch 82 contains multiple switches that enable and disable the various air guns 52. Addition switches in DIP switch 82 control the sequence of enabled guns that are activated each discharge cycle. For example, closing a first switch allows an associated air gun to activate each discharge cycle. A second switch in DIP switch 82 enables or disables a second air gun, etc. Additional switches in DIP switch 82 control the sequence of enabled air guns that activate each discharge cycle. For example, another switch in DIP switch 82 when closed directs microprocessor 92 to alternate every other enabled air gun every other discharge cycle as is shown in detail below in FIGS. 10 and 11.

By controlling the number of activated air guns, a machine operator can control the fluid pressure output from each activated nozzle. Disabling more air guns with DIP switch 82 proportionally increases the pressure exerted by each enabled nozzle. By increasing fluid pressure each hole can be drilled at a greater depth.

Figure 9:
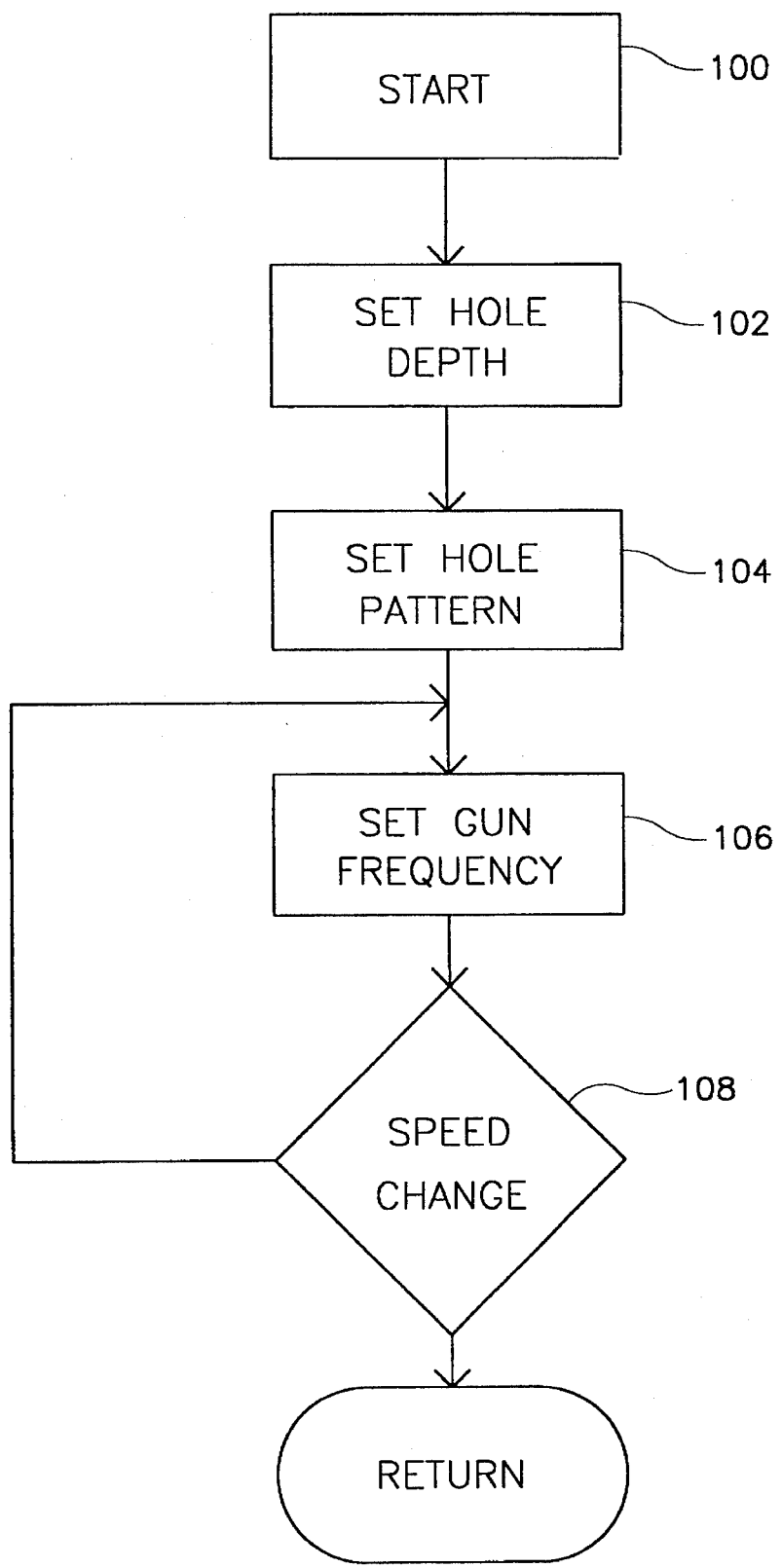
FIG. 9 is a block diagram showing the functions performed by the programmable control circuit shown in FIG. 8.

According to the signals generated by DIP switches 82, 84, and 86 and the pulse signal from magneto divider 90, microprocessor 92 generates output signals to transistors 94, 96, and 98. Each transistor is coupled to a corresponding solenoid valve that connects and disconnects air pressure to an associated air gun 52. When the signal coupled to the base of transistor 94 is active high, transistor 94 turns on pulling the signal to solenoid 1 to five volts. Solenoid 1 then activates coupling air from air hose 21 (FIG. 1) to a corresponding air nozzle 59 (FIG. 4) on air gun 52. Air entering nozzle 59 raises pin 66 (FIG. 6) allowing fluid from manifold 54 to enter the air gun. FIG. 9 is a block diagram showing the different functions performed by the control circuit 78 shown in FIG. 8. Referring to FIGS. 8 and 9, the control circuit 78 is first started by closing on-off switch 81 as stated in block 100. The combination of selected DIP switches 82 and 84 control the number of air guns activated and the amount of time each enable air gun remains on for each discharge cycle. Thus, circuit 78 controls the depth each hole is drilled into the ground as stated in block 102.

The combination of switches closed in DIP switch 82 control the pattern of guns that are activated each discharge cycle as shown in block 104. Block 106 then receives the repeat interval information from DIP switch 86 and the pulse sequence from magneto divider 90 generating the necessary air gun discharge frequency that creates the desired hole spacing. Decision block 108 checks machine speed. If the machine speed changes, decision block 108 jumps back to block 106 readjusting the discharge frequency for the air guns. Thus, the air guns generate consistent hole spacing for changes in machine speed. The process then continues to monitor the DIP switches for new input commands.

Figure 10:
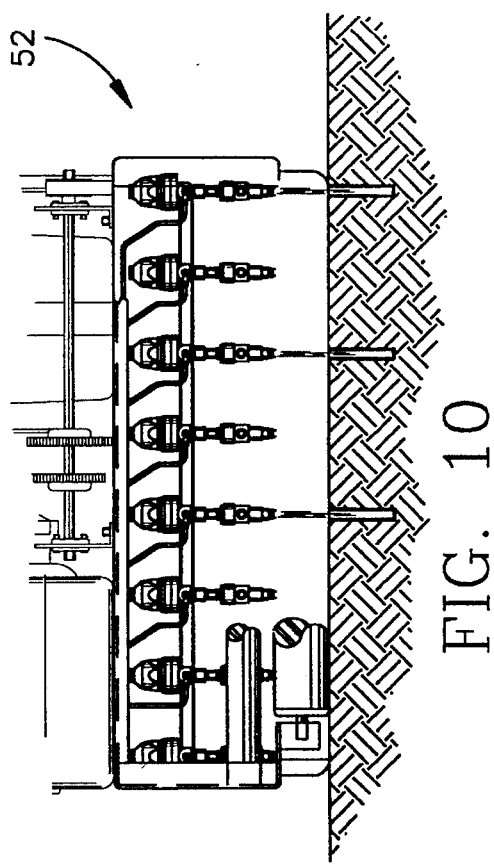
FIG. 10 is an isolated front view of the machine illustrating a first air gun discharge cycle.
Figure 11:
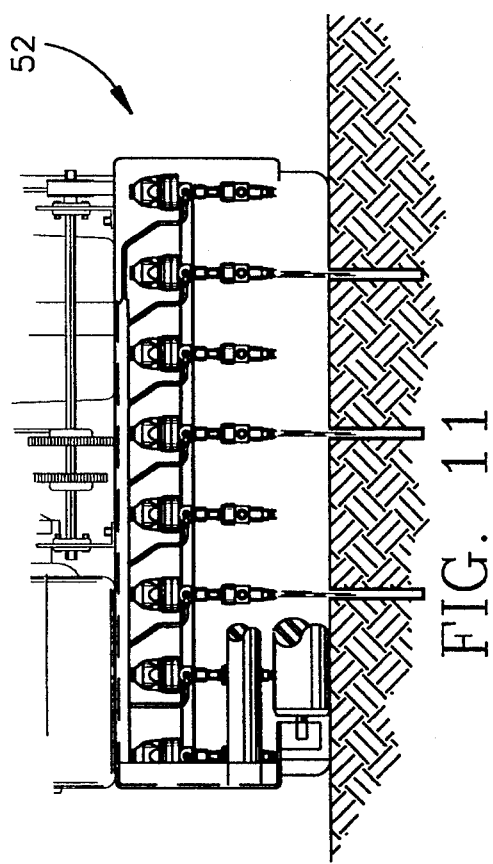
FIG. 11 is an isolated front view of the machine illustrating a second air gun discharge cycle.

FIG. 10 is an isolated front view of machine 12 during a first discharge cycle and FIG. 9 is a isolated front view of machine 12 during a second discharge cycle. According to the number and arrangement of switches selected in DIP switch 82 (FIG. 8), every other air gun 52 is activated during the first discharge cycle shown in FIG. 10. Accordingly, during the second discharge cycle, shown in FIG. 11, the air guns previously activated during the first discharge cycle are deactivated and the remaining air guns are activated. The sequence shown in FIGS. 10 and 11 is then repeated so that for a third discharge cycle, the nozzles shown discharging in FIG. 10 are again reactivated. Any combination of nozzles can be controlled each discharge cycle.

Figure 12:
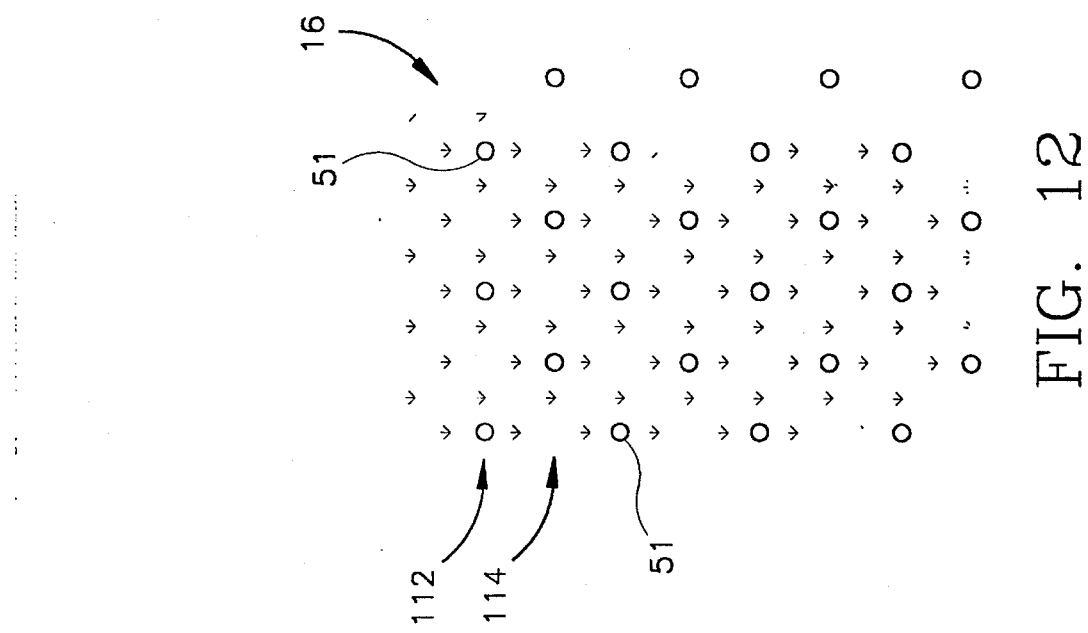
FIG. 12 is a hole pattern generated by the air guns shown in FIGS. 10 and 11.

FIG. 12 is a top view of golf green 16 showing the hole pattern created from the air gun discharge configuration shown in FIGS. 10 and 11. Row 112 shows the holes formed during the first discharge cycle and row 114 show the holes formed during the second discharge cycle. Varying the combination of activated air guns allow a greater variety of hole patterns. Holes can then be spaced farther apart both in the forward direction of the machine as it travels along the golf green and laterally between adjacent air guns. Thus, machine 12 is more adaptable to different turf conditions and can vary the aesthetics of the golf green 16 by varying hole patterns. In addition, an offset hole pattern as shown in FIG. 12 can provide a more desirable putting surface for golfers.

Figure 13:
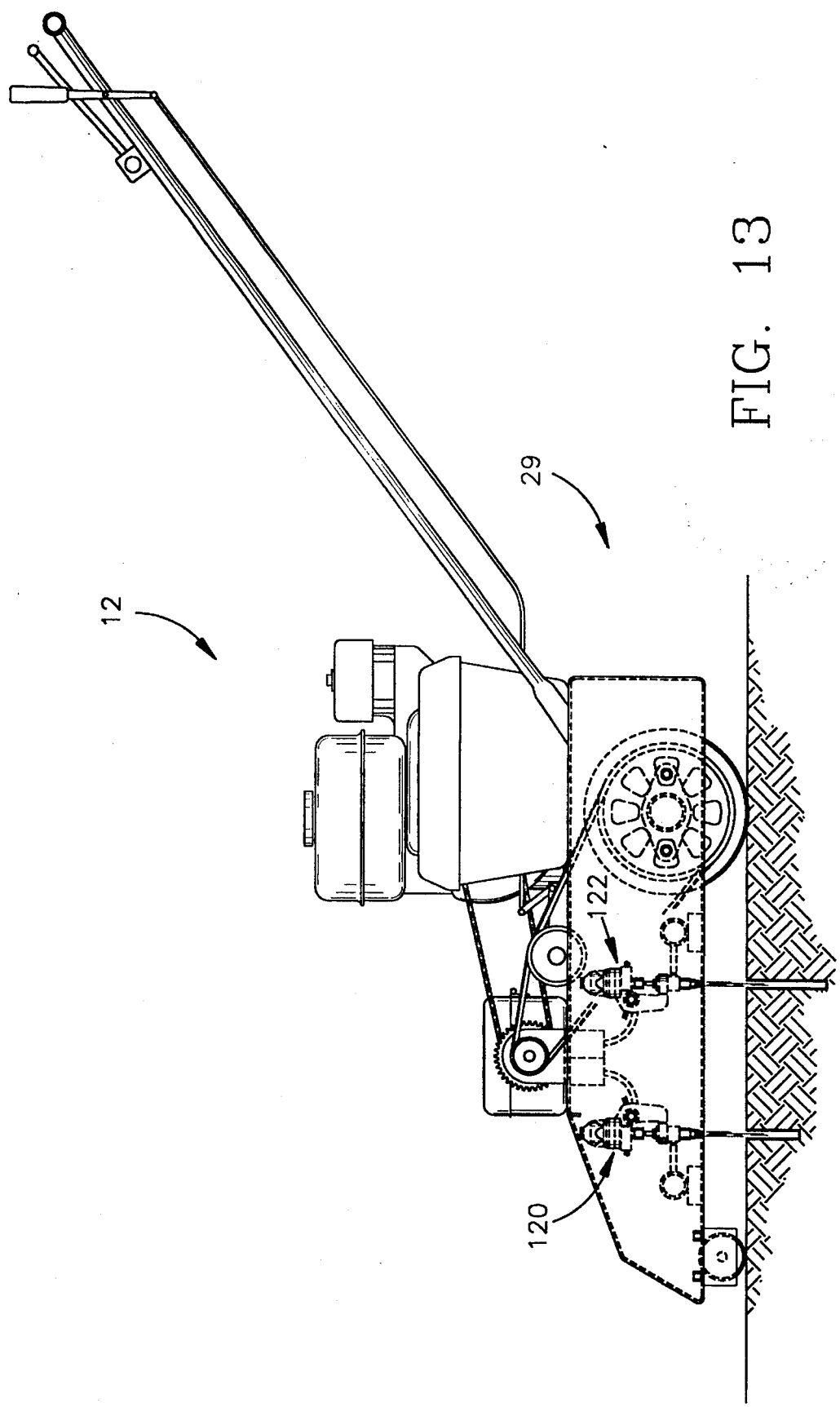
FIG. 13 is a side view of a dual row turf conditioning machine according to an alternative embodiment of the invention.

FIG. 13 is a side view of a dual head turf conditioning machine according to another embodiment of the invention. A first set of air guns 120 are positioned in substantially the same location as air guns 52 shown in FIG. 2. A second row of air guns 122 are located in the middle of frame 29. Each row of air guns is separately controllable to provide more flexibility in drilling holes. For example, each row of air-guns can activate concurrently during the same discharge cycle or in a staggered arrangement. Alternatively, each row of nozzles can be directed to drill holes of different depths into the golf green as shown in FIG. 13. Multiple rows of air guns activated at the same time allow machine 12 to drill more holes into the golf green in a shorter amount of time.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A machine for dispersing fluids into a golf green comprising:

a frame having wheels that extend from a bottom side for carrying the frame over the golf green;

a set of electronically actuated air guns each having a downwardly directed nozzle, each gun held by the frame a given distance above the golf green and dispersing a stream of fluid a variable distance into the ground when in an actuated state; and a programmable control circuit electrically coupled to each gun for individually enabling and disabling each gun and at the same time controlling on-time and repeat interval in which each enabled nozzle is actuated, the programmable control circuit selectively changing the number of actuated guns thereby controlling the depth that fluid from each enabled nozzle disperses into the ground.

2. A machine according to claim 1 wherein the control circuit includes a microprocessor coupled to a set of solenoids, each solenoid pneumatically controlling the actuation and deactivation of at least one gun.

3. A machine according to claim 2 wherein the control circuit includes a bank of switches each coupled to a microprocessor for controlling actuation of the solenoids and at what repeat interval the solenoids are actuated.

4. A machine according to claim 1 including a baffle insertable into each nozzle for dispersing fluid from the nozzle into the ground at a substantially uniform width, so as to allow drilling a vertically aligned hole in the ground having a substantially uniform cross-sectional shape.

5. A machine according to claim 1 including a portable storage tank coupled to the set of guns, the storage tank locatable off the golf green while the frame carries the nozzles over said golf green.

6. A machine according to claim 1 wherein the air guns are aligned in a collinear relationship and including an elongated manifold spaced from the air guns in a horizontally adjacent parallel relationship, the manifold fluidly joined at a bottom section of each gun just above each gun nozzle.

7. A machine according to claim 1 including a first and second row of guns, each row being joined to a corresponding horizontally aligned manifold.

8. A machine according to claim 1 wherein the frame comprises vertically aligned side walls joined together at a back end by a back wall and further comprising a horizontally aligned mounting plate joined at a top end of the side walls and the back wall.

9. A machine according to claim 8 wherein the total weight of the machine is less than 200 pounds.

10. A machine according to claim 8 wherein the side walls and the back wall form a substantially rectangular external frame shape.

11. A machine for dispersing fluids into a golf green comprising:

a frame having wheels that extend from a bottom side for carrying the frame over the golf green;

a set of electronically actuated air guns each having a downwardly directed nozzle, each gun held by the frame a given distance above the golf green and dispersing a stream of fluid a variable distance into the ground when in an actuated state; and a programmable control circuit electrically coupled to each gun for individually enabling and disabling each gun and at the same time controlling on-time and repeat interval in which each enabled nozzle is actuated;

a baffle insertable into each nozzle for dispersing fluid from the nozzle into the ground at a substantially uniform width, so as to allow drilling a vertically aligned hole in the ground having a substantially uniform cross-sectional shape; and means for dispensing a hydrated polymer into the ground that is partially retained in the hole for absorbing ground moisture.

12. A machine for dispersing fluids into a golf green comprising:

a frame having wheels that extend from a bottom side for carrying the frame over the golf green, the frame further including vertically aligned side walls joined together at a back end by a back wall and a horizontally aligned mounting plate joined at a top end of the side walls and the back wall;

a set of electronically actuated air guns each having a downwardly directed nozzle, each gun held by the frame a given distance above the golf green and dispersing a stream of fluid a variable distance into the ground when in an actuated state; and a programmable control circuit electrically coupled to each gun for individually enabling and disabling each gun and at the same time controlling on-time and repeat interval in which each enable nozzle is actuated;

the frame wheels comprising a pair of elongated rollers positioned in front and in back of the guns, respectively, and further comprising an engine attached to the mounting plate for rotating the back roller.

13. A machine for dispersing fluids into a golf green comprising:

a frame having wheels that extend from a bottom side for carrying the frame over the golf green, the frame further including vertically aligned side walls joined together at a back end by a back wall and a horizontally aligned mounting plate joined at a top end of the side walls and the back wall;

a set of electronically actuated air guns each having a downwardly directed nozzle, each gun held by the frame a given distance above the golf green and dispersing a stream of fluid a variable distance into the ground when in an actuated state; and a programmable control circuit electrically coupled to each gun for individually enabling and disabling each gun and at the same time controlling on-time and repeat interval in which each enabled nozzle is actuated;

the mounting plate extends from the back wall partially over the top ends of the side walls and the guns are mounted between the two side walls in front of the mounting plate.

14. A machine for dispersing fluids into a golf green comprising:

a frame having wheels that extend from a bottom side for carrying the frame over the golf green;

a set of downwardly directed nozzles, each nozzle held by the frame a given distance above the golf green and dispersing a stream of fluid a variable distance into the ground when in an actuated state;

a control circuit for enabling and disabling nozzles;

a baffle insertable into each nozzle for dispersing fluid from the nozzle into the ground at a substantially uniform width, the fluid dispersed from the nozzle drilling a vertically aligned hole in the ground having a substantially uniform cross-sectional shape; and the baffle comprising a "figure-8" cross-sectional shape.

15. A machine for dispersing fluids into a golf green comprising:

a frame having wheels that extend from a bottom side for carrying the frame over the golf green;

a set of nozzles held by the frame a given distance above the golf green and dispersing a stream of fluid a variable distance into the ground when in an actuated state;

a control circuit for enabling and disabling each nozzle;

the frame wheels comprising a pair of elongated rollers positioned in front and in back of the nozzles; and an engine attached to the frame for rotating the back roller.

16. A machine according to claim 15 wherein the frame further includes vertically aligned side walls joined together at a back end by a back wall and a horizontally aligned mounting plate joined at a top end of the side walls and the back wall, the mounting plate extending from the back wall partially over the top ends of the side walls and the nozzles mounted between the two side walls in front of the mounting plate.

* * * * *